United States Patent [19]
Dankert et al.

[11] Patent Number: 5,477,537
[45] Date of Patent: Dec. 19, 1995

[54] METHOD FOR ACCESSING ADDRESS FEATURES OF COMMUNICATION SUBSCRIBERS WHEN SENDING DATA PACKETS

[75] Inventors: Uwe Dankert, Munich; Rainer Storn, Kirchheim, both of Germany

[73] Assignee: Siemens Aktiengesellschaft, Munich, Germany

[21] Appl. No.: 223,858

[22] Filed: Apr. 6, 1994

[30] Foreign Application Priority Data

Apr. 6, 1993 [DE] Germany .................. 43 11 291.9

[51] Int. Cl.$^6$ .................................. H04L 12/56
[52] U.S. Cl. .................................. 370/60; 370/94.1
[58] Field of Search ............... 370/94.1, 85.13, 370/94.3, 60, 85.14

[56] References Cited

U.S. PATENT DOCUMENTS

| | | | |
|---|---|---|---|
| 4,933,937 | 6/1990 | Konishi | 370/85.13 |
| 5,151,897 | 9/1992 | Suzuki | 370/85.13 |
| 5,210,748 | 5/1993 | Onishi et al. | 370/85.13 |
| 5,282,201 | 1/1994 | Frank et al. | 370/94.1 |

FOREIGN PATENT DOCUMENTS 0522743  1/1993  European Pat. Off. .

OTHER PUBLICATIONS

A. Aho et al., *Data Structures and Algorithms*, Addison–Wesley Series in Computer Science and Information Processing, Chapter 4, "Basic Operations On Sets", pp. 107–154, (1983).

Ollmert, H. J., Datenstrukturen und Datenorganisationen, Oldenbourg, 1989, 5. Gestreut Speicherung (Hashing), pp. 133–162.

Edward Yourdon, "Design of On–Line Computer Systems", Prentice–Hall, Inc., Englewood Cliffs, N.J., 1972, ISBN 0–13–201301–0, pp. 281–291.

*Primary Examiner*—Douglas W. Olms
*Assistant Examiner*—Ricky Ngo
*Attorney, Agent, or Firm*—Hill, Steadman & Simpson

[57] ABSTRACT

A method for rapidly accessing address features of communication subscribers, in particular, when reading data packets is provided. Performance features of the communication connection are deposited in tables in the form of addresses that must be successively searched. A large address area from which a sub-set of addresses is used, is compressed onto a compressed address area of the same size as the sub-set of the addresses used, thereby obtaining miniaturized addresses. Since a plurality of tables must be searched per address entry, different tables to be checked are activated via offsets proceeding from the compressed address area. The communication load for the address transfer is reduced as a result and a shortened calculating time is achieved in comparison to a hash addressing.

5 Claims, 2 Drawing Sheets

FIG. 1

| SYNC. | SA | DA | PL (PAYLOAD) |

FIG. 2

| SEARCH KEY | TABLE | CHECK |
|---|---|---|
| SA | SA-SCREENING-TABLE | IS SA PERMITTED TO SEND TO DA? |
| DA | DA-SCREENING-TABLE | DOES DA WISH TO RECEIVE FROM SA? |
| DA | GROUP-ADDRESS-TABLE | IS AN ENTIRE GROUP OF DESTINATION ADDRESSES HIDDEN UNDER DA? |
| SA | DATA PACKET MEMORY | HAVE DATA PACKETS ALREADY BEEN SENT WITH THE SAME SA? |
| DA | CHANNEL TABLE | WHAT (VIRTUAL) OUTPUT CHANNEL IS THE DA ASSIGNED TO? |

FIG. 4

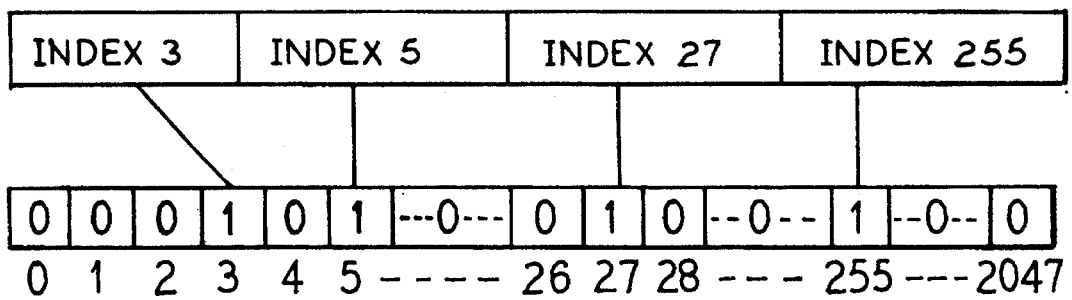

METHOD FOR ACCESSING ADDRESS FEATURES OF COMMUNICATION SUBSCRIBERS WHEN SENDING DATA PACKETS

BACKGROUND OF THE INVENTION

1. Field of the Invention

The present invention is directed generally to data switching systems and more specifically to a method for accessing address features of communication subscribers having a first address area when sending dam packets.

2. Description of the Related Art

A variety of tests are implemented in communication connections, particularly upon set up and clear down thereof. These tests are particularly related to declarations between a communication subscriber and a purveyor of communication services.

For example, such features of communication connections are time-dependent use tariffs, allowable recipient addresses, allowable subscriber groups of communication connections, and receiver groups addressable in common. A constant set up and clear down of the connection particularly occurs when switching and sending data packets.

A plurality of addresses are therefore contained in the data packets of a data switching system. A switching computer, which processes a data packet, must usually check addresses for a plurality of conditions, as indicated above. Such checks are generally provided for via table accesses. Address features corresponding to the individual addresses are therefore contained in these tables.

The matching entry in the respective table must be found for a specific address. For example, the matching address for a sender address or a receiver address is necessarily searched for a longer time period when there are more such tables. The address itself thereby represents what is referred to as a search key. The entry in a table matching the respective search key generally contains the search key itself along with further information to enable a check of whether the key used for the search and that of the table entry agree, i.e. whether the correct table entry has been addressed. It is desirable that the search procedures sequence as quickly as possible, particularly when such address search processes occur frequently, as is the case of data switching computers.

An example of a known solution for addressing tables is hashing. In hashing, the search key is directly used as the argument of a hash function which, in the ideal case, directly supplies the sought memory location of the table as a result. In this case, the search key would be stored under the address. This method of hashing is generally very fast but is sometimes not fast enough, since the calculation of the hash function using software is often complicated. A corresponding plurality of hash function calculations must be implemented particularly when there are many tables, which leads to a considerable overall calculating time.

A binary search represents another known possibility for locating table entries. Given the application thereof, one reaches a defined upper limit for the search time. However, it assumes an ordered table and has problems with table updates. In general, it is not as fast as hashing but utilizes the available storage space more efficiently.

Direct addressing represents yet another known possibility for locating table entries. The key would thereby be directly used as an address in this method. Thus, this is the fastest overall software addressing method. However, a great deal of storage space is required, and the space is incompletely used. This is particularly true when only a limited, substantially smaller sub-plurality of addresses are selected from a large address area. Given a 64-bit wide CCITT E. 164 address for both the sender address as well as the receiver address, $2^{64}$ entries would be required for a table. This is true even though only 2048 addresses thereof are possibly used in a switching system. Also, given a 32-bit wide entry per theoretically possible address, this would require a memory having the size $7.2 \times 10^{10}$ Gbyte, of which only 8 Kbytes would be filled.

It is an object of the present invention to provide a method for fast access onto address features of communication connections that are deposited in tables.

The method of the present invention advantageously exploits the fact that performance features associated with a customer are interrogated in a repeating sequence, and the number of these performance features is known. These features are thus deposited in a fixed plurality of tables and must constantly be re-interrogated in a repeating sequence for every data packet. The method of the invention advantageously provides a solution to this problem. First, the large, allowable address area is compressed onto a small address area having consecutive neighboring addresses. Second, the table search occurs via offsets of the addresses of the miniaturized address area. When the direct allocation is implemented via a hash function, an advantageous combination of hash-function addressing and direct addressing results. A greater speed advantage is achieved over direct addressing depending on the size of the number of tables.

Further, communication traffic for the addressing is advantageously reduced by the miniaturization of the address area. Since, for example, data words that are only 11 bits wide instead of 64 bits wide are searched, the result of the data search is obtained much faster.

Further, the method of the invention can be accelerated because it is not the addresses of the first address area that are stored in the tables but the addresses of the second address area. Thus, search actions are advantageously quicker by using the miniaturized addresses.

As inventively provided, a further speed acceleration is advantageously obtained when the presence of an address in a table is identified by 1 bit. Thus, a table search thereby only involves checking a set bit instead of checking for the presence of an address. For example, a plurality of existing addresses are thereby indicated by a bit word.

The method of the invention is particularly advantageously suited for use in communication connections in combination with the review of access authorizations. An accelerated and a reliable sequencing of data communications can be assured with the method of the present invention.

Further, data packet switchings can be accelerated by using the method of the invention, to check packet addresses and receiver addresses that are frequently required in such switchings.

The objects of the present invention are inventively in a method for accessing address features of communication subscribers area when sending data packets, having the steps of providing at least one first address corresponding to each the communication subscriber in a first address area, entering address features of the communication subscribers into an addressable memory, selecting an arbitrary subplurality of the first addresses from the first address area, prescribing a second address area having a plurality of second addresses incremented such that consecutive addresses of the memory are addressed, the plurality of second addresses corresponding to the sub-plurality of the first addresses, allocating exactly one first address to each second address, accessing a first address feature via a second address, and accessing further address features via an offset of the second address.

A more detailed description of the present invention shall be set forth below with reference to the figures.

BRIEF DESCRIPTION OF THE DRAWINGS

FIG. 1 shows an example of a dam packet that can be used in the method of the present invention.

FIG. 2 shows examples of search keys in combination with tables and check actions that can be used in the method of the present invention.

FIG. 4 shows an example of the bit-by-bit identification of address entries in tables in the method of the invention.

DETAILED DESCRIPTION OF THE PREFERRED EMBODIMENT

Figure 3:
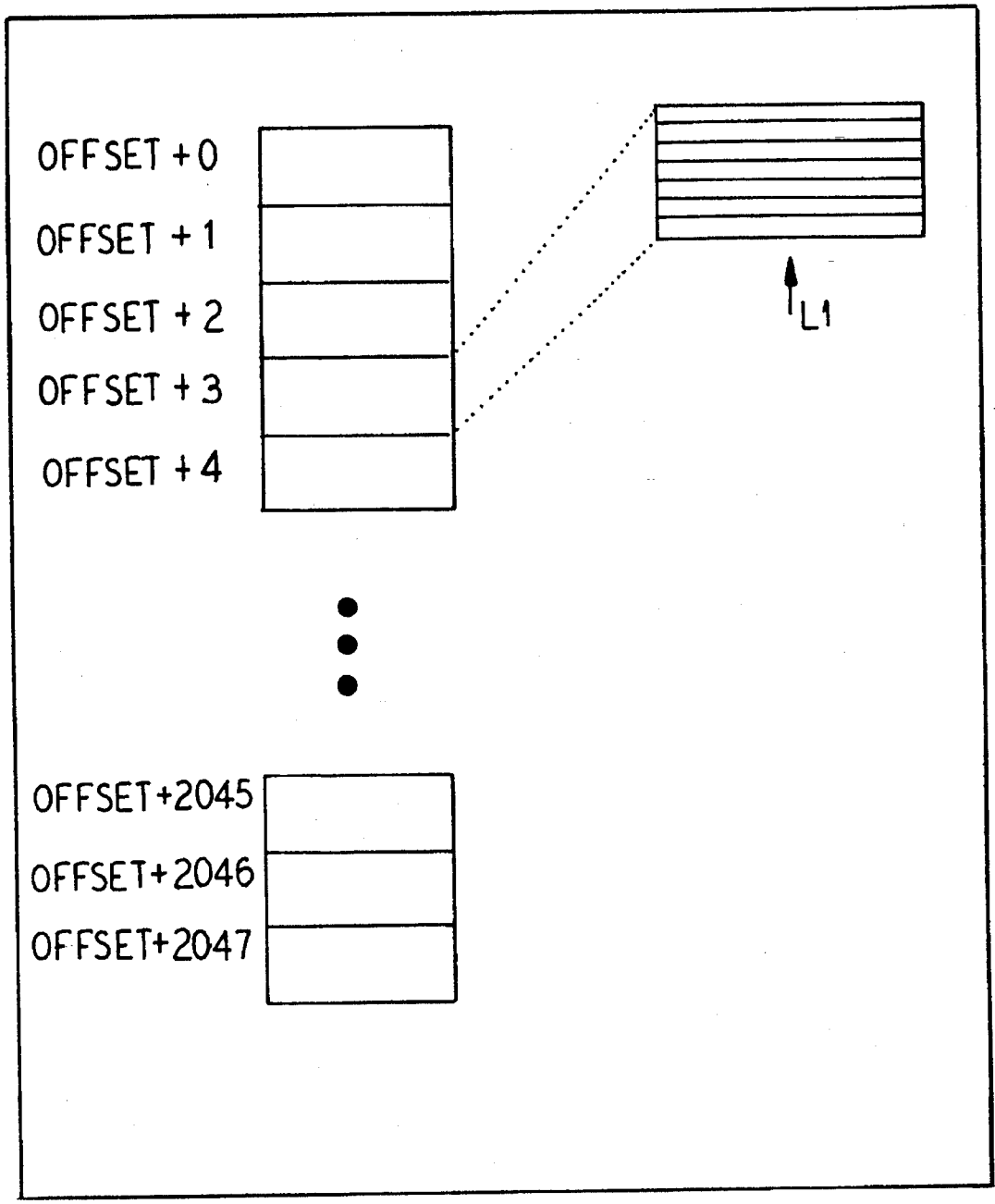
FIG. 3 shows an example of the addressing method of the invention.

FIG. 1 shows an exemplary data packet of a type that can be used in the method of the present invention. What are shown are a synchronization Sync, a sender address SA and a destination address DA. Further, a useful data PL (payload) is shown. It is inventively provided to implement various checks with the addresses SA and DA. To this end, the addresses SA and DA are reduced from, for example, 64 bits to 11 bits according to the method of the invention. Given the limited communication capacity of a communication equipment, the data exchange for the addressing is thereby accelerated, since only 11-bit addresses need be transmitted instead of 64-bit addresses. Further, the calculating time for search procedures is accordingly shortened, since a search for 11-bit addresses sequences much faster than a search for 64-bit addresses.

FIG. 2 shows, in table form, examples for the use of sender and receiver addresses in tables and the associated checks connected therewith. The sender address SA, for example, is conducted in a SA-screening of the table. A check is carried out therein for every sender address to determine whether this address can address a specific receiver address. This screening table also exists for the receiver address and identifies which receiver wants to receive from which sender addresses. Further, group address tables can exist in the present invention. Thus, receiver addresses that belong to a group are contained in the group address tables. A larger receiver circle can thus be addressed by one address in a simple way in the present invention.

Also, data packet memories can be provided in an embodiment of the invention. The data packet memories can be checked to see whether data packets having the same sender address SA have already been sent. In addition, a channel table can, for example, be provided wherein the destination address DA is checked to determine which virtual output channel it is allocated.

However, the above listing is not a complete enumeration of tables that could possibly be provided in the method of the present invention. On the contrary, a great variety of further checks can be provided with a communication customer dependent on the declaration. Thus, the method of the invention accesses even more advantageously when more tables must be addressed per sender or per destination address. Because the number of directly addressable tables increases with the plurality of tables, the calculating outlay for the address transformation becomes lower relative to direct addressing. A speed advantage when compared, for example, to the use of a hash method is thus achieved by the method of the present invention.

FIG. 3 shows an example of an addressing of a table with the method of the invention. In this example 2048 table entries (0–2047) are provided. For example, these table entries reference memory addresses of a hardware memory. These memory addresses are identified by their numbers and with an offset. The reference to a List 1 which, for example, identifies the individual performance features or addresses to be handled, in conjunction with a specific memory address, is identified by dot-dash lines. The memory shown here, for example, can be a table addressed in FIG. 2. The table thus contains various sender and destination addresses. The offset characterizes the address offset of the second address. A different offset is defined for each table. For example, locating such a table entry according to the method of the invention proceeds as follows: first, a memory area that only contains 2048 addresses as in this example is generated from the 64-bit address of the possible address space via, for example, a hash function. Each 64-bit address is thus allocated to exactly one of these 2048 addresses. The method of the invention uses the known second address to search the variety of tables with respect to the sender and destination addresses via the offsets. Also, a corresponding performance feature catalog is present in each table for each second address. Thus, various sender and destination addresses or other further features are contained in the table dependent on the presentation mode desired. The SA screening table, for example, is addressed for the first address via an offset, the DA screening table is addressed via a further offset, and the group address table is addressed via a third offset. This access onto the different tables occurs successively via the offsets and no further calculating time is therefore required for such access. Thus, the method of the present invention has the advantage of being implemented very rapidly.

FIG. 4 shows an example of how the search for addresses entered in the tables can be accelerated by using the method of the present invention. The address entries for the addresses 3, 5, 27 and 255 are referenced with index 3, index 5, index 27 and index 255. For example, these entries are contained in the SA screening table. Thus, the four addresses 3, 5, 27 and 255 are addresses to which the address for which this table entry is valid is allowed to send. The search procedure in the SA screening table can then be accelerated in that a 2048 bit-wide word is provided for the entire memory area. Then, the corresponding bits are set at the locations for the allowable addresses, and the other bits are left at 0. In this case, this means that the 4th, 6th, 28th and 256th bit are set to 1 in this 2048 bit-wide word and that all of the other bits are 0.

This mode of presentation has the advantage that a different word is obtained for every address configuration and that very fast comparisons can thus be implemented.

Although other modifications and changes may be suggested by those skilled in the art, it is the intention of the inventors to embody within the patent warranted hereon all changes and modifications as reasonably and properly come within the scope of their contribution to the art.

We claim:

1. A method for accessing address features of communication subscribers when sending data packets, comprising the steps of:

providing a first address area having a plurality of first addresses corresponding to each of said communication subscribers;

entering the address features of said communication subscribers into an addressable memory;

selecting an arbitrary sub-plurality of said plurality of first addresses from said first address area;

providing a second compressed address area having a second plurality of second addresses incremented such that consecutive addresses of said memory are addressed, said second plurality of second addresses corresponding in number to said sub-plurality of said plurality of first addresses;

allocating, only once, exactly one of said plurality of first addresses to each of said plurality of second addresses;

accessing a first address feature via a second address of said second compressed address area; and accessing further address features via an offset of said second address.

2. The method according to claim 1, further comprising the step of:

provicing at least one said address feature in said second address.

3. The method according to claim 1 wherein said address features include a, first sequence, further comprising the following steps:

interrogating said first sequence of said address features per said accessing step; and indicating the presence of one of said addresses in said first sequence via one bit.

4. The method according to claim 1, being further defined by providing said addresses corresponding to wherein said address features represent features of communication connections.

5. The method according to claim 1, said method being further defined by providing said addresses controlling data packets of a packet switching.

* * * * *